US010742629B2

(12) United States Patent
Krauss (10) Patent No.: US 10,742,629 B2
(45) Date of Patent: Aug. 11, 2020

(54) EFFICIENT CLOUD RESOURCE PROTECTION

(71) Applicant: International Business Machines Corporation, Armonk, NY (US)

(72) Inventor: Kirk J. Krauss, San Jose, CA (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 227 days.

(21) Appl. No.: 15/445,937

(22) Filed: Feb. 28, 2017

(65) Prior Publication Data

US 2018/0248882 A1 Aug. 30, 2018

(51) Int. Cl.
*H04L 29/06* (2006.01)
*H04L 29/08* (2006.01)
*G06F 9/50* (2006.01)

(52) U.S. Cl.
CPC ............ *H04L 63/08* (2013.01); *G06F 9/5027* (2013.01); *H04L 63/105* (2013.01); *H04L 67/10* (2013.01)

(58) Field of Classification Search
None
See application file for complete search history.

(56) References Cited

U.S. PATENT DOCUMENTS

| 7,627,593 | B2 * | 12/2009 | Boykin | ................. G06F 9/5005 |
| 8,539,567 | B1 | 9/2013 | Logue et al. | |
| 8,650,550 | B2 | 2/2014 | Carrara et al. | |
| 8,935,756 | B2 | 1/2015 | Islam et al. | |
| 8,997,196 | B2 | 3/2015 | Kariv et al. | |
| 9,059,910 | B1 | 6/2015 | Liu et al. | |
| 9,087,209 | B2 | 7/2015 | Mattsson et al. | |
| 9,166,893 | B2 | 10/2015 | Brandt et al. | |
| 9,396,343 | B2 * | 7/2016 | Factor | ................... H04L 63/101 |
| 9,426,155 | B2 | 8/2016 | Chao et al. | |
| 2006/0053426 | A1 * | 3/2006 | Dive-Reclus | ........... G06F 21/53 719/328 |
| 2006/0200635 | A1 * | 9/2006 | Pudipeddi | ........... G06F 12/0261 711/152 |
| 2007/0156601 | A1 * | 7/2007 | Brew | ...................... G06F 21/10 705/57 |

(Continued)

OTHER PUBLICATIONS

Bugliesi et al., "Gran: model checking grsecurity RBAC policies", 2012, IEEE 25th Computer Security Foundations Symposium, p. 126-138. (Year: 2012).*

(Continued)

*Primary Examiner* — Jeffery L Williams
(74) *Attorney, Agent, or Firm* — Samuel Waldbaum, Esq.; McGinn IP Law Group, PLLC (57) ABSTRACT

A cloud resource protection method, system, and computer program product include authenticating a user on a first computer that is part of a distributed system, based on the authentication, assigning to the user, on the first computer, a token indicating a set of permissions, receiving a directive from the user to initiate, via the first computer, the execution of a process associated with a class, based on the token, initiating, on a second computer, the execution of the process, with no further authentication, granting the process access to a data set, access to which is restricted to one or more of the plurality of classes, and providing a data item from the data set to the user.

13 Claims, 7 Drawing Sheets

(56) References Cited

U.S. PATENT DOCUMENTS

| | | | | |
|---|---|---|---|---|
| 2014/0013409 | A1* | 1/2014 | Halageri | H04L 63/0815 |
| | | | | 726/8 |
| 2014/0157260 | A1* | 6/2014 | Balani | G06F 9/45533 |
| | | | | 718/1 |
| 2014/0317716 | A1* | 10/2014 | Chao | H04L 63/10 |
| | | | | 726/9 |
| 2014/0359128 | A1* | 12/2014 | Bhattacharya | H04L 67/1097 |
| | | | | 709/226 |
| 2015/0381641 | A1* | 12/2015 | Cabrera | H04L 63/1425 |
| | | | | 726/23 |
| 2015/0381651 | A1* | 12/2015 | Lietz | H04L 63/1441 |
| | | | | 726/23 |
| 2016/0034359 | A1* | 2/2016 | Cabrera | G06F 11/1464 |
| | | | | 714/19 |
| 2016/0036795 | A1* | 2/2016 | Lietz | H04L 63/08 |
| | | | | 726/4 |
| 2016/0036835 | A1* | 2/2016 | Lietz | H04L 63/1416 |
| | | | | 726/22 |
| 2016/0072821 | A1 | 3/2016 | Wu | |
| 2016/0103593 | A1 | 4/2016 | Wynne, IV et al. | |
| 2016/0110553 | A1* | 4/2016 | Factor | H04L 63/101 |
| | | | | 726/30 |
| 2016/0112447 | A1* | 4/2016 | Lietz | H04L 63/1408 |
| | | | | 726/23 |
| 2016/0173502 | A1 | 6/2016 | Statchuk | |
| 2016/0182527 | A1* | 6/2016 | Lietz | H04L 63/105 |
| | | | | 726/6 |
| 2016/0255080 | A1 | 9/2016 | Griffin et al. | |
| 2016/0277374 | A1 | 9/2016 | Reid et al. | |
| 2017/0046181 | A1* | 2/2017 | Williams | G06F 9/44526 |
| 2017/0111365 | A1* | 4/2017 | Michael | H04L 63/102 |
| 2018/0074748 | A1* | 3/2018 | Makin | G06F 9/4856 |
| 2018/0248882 | A1* | 8/2018 | Krauss | H04L 63/102 |
| 2019/0087118 | A1* | 3/2019 | Makin | G06F 3/0604 |

OTHER PUBLICATIONS

Mel, et al. "The NIST Definition of Cloud Computing". Recommendations of the National Institute of Standards and Technology. Nov. 16, 2015.

Yang, K., Jia, X., Ren, K. et al. (2013). "DAC-Macs: effective data access control for multiauthority cloud storage systems". IEEE Transactions on Information Forensics and Security, 8(11), 1790-1801.

Ruj, S., Stojmenovic, M., & Nayak, A. (2012). "Privacy preserving access control with authentication for securing data in clouds". Cluster, Cloud and Grid Computing (CCGrid), 2012 12th IEEE/ACM International Symposium, 556-563.

Zissis, D., & Lekkas, D. (2012). "Addressing cloud computing security issues. Future Generation computer systems", 28(3), 583-592.

Sadeghi, A. R., Schneider, T., & Winandy, M. (2010). "Token-based cloud computing". In International Conference on Trust and Trustworthy Computing, 417-429.

* cited by examiner

EFFICIENT CLOUD RESOURCE PROTECTION

BACKGROUND

The present invention relates generally to a cloud resource protection method applicable to a cloud computing environment, and more particularly, but not by way of limitation, to a system, method, and computer program product for assigning processes and/or applications runnable on a distributed system to classes, such that each class is associated with an access control policy.

As hardware-virtualization-based distributed systems scale and proliferate, new security issues arise, such as the increasing need for controls over interacting virtual machines (VMs) and the potential for exposure of sensitive data as VMs are cloned, resized, or migrated. Also, virtualization does not come for free. That is, virtualization levies at least a 2% to 7% CPU tax on top of the considerable memory overhead it imposes, along with the potential to "kill performance" across the board for all processes running on a host system in the event that one or more virtualized guest systems overload the host system. Nevertheless, the conventional methods for cloud computing require the overhead and risks associated with hardware virtualization.

An infrastructural methodology that would make cloud-computing without virtualization easy to implement, without losing the anticipated security benefits that brought virtualization into the cloud computing paradigm from the start, is needed to solve the above-mentioned problems in the conventional techniques. That is, to make a non-virtualized cloud infrastructure workable, process or application classes, deployable to any node on the cloud, can be the centerpiece of access control policies. In the conventional techniques, access control policies have been established based simply around who the logged-in user is. Some other conventional techniques consider distributed security models that provide for security rules to be assigned per process per node. In other conventional techniques, pools of resources or applications also can be secured as a set.

However, the conventional techniques fail to treat a process or application class as a basis for determining access to not only executable code but also at least some data, throughout a cloud computing infrastructure.

SUMMARY

In an exemplary embodiment, the present invention can provide a computer-implemented cloud resource protection method, the method including authenticating a user on a first computer that is part of a distributed system, based on the authentication, assigning to the user, on the first computer, a token indicating a set of permissions, receiving a directive from the user to initiate, via the first computer, the execution of a process associated with a class, based on the token, initiating, on a second computer, the execution of the process, with no further authentication, granting the process access to a data set, access to which is restricted to one or more of the plurality of classes, and providing a data item from the data set to the user. One or more other exemplary embodiments include a computer program product and a system.

Other details and embodiments of the invention will be described below, so that the present contribution to the art can be better appreciated. Nonetheless, the invention is not limited in its application to such details, phraseology, terminology, illustrations and/or arrangements set forth in the description or shown in the drawings. Rather, the invention is capable of embodiments in addition to those described and of being practiced and carried out in various ways that should not be regarded as limiting.

As such, those skilled in the art will appreciate that the conception upon which this disclosure is based may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

BRIEF DESCRIPTION OF THE DRAWINGS

Aspects of the invention will be better understood from the following detailed description of the exemplary embodiments of the invention with reference to the drawings, in which.

DETAILED DESCRIPTION

The invention will now be described with reference to FIGS. 1-5, in which like reference numerals refer to like parts throughout. It is emphasized that, according to common practice, the various features of the drawings are not necessarily to scale. On the contrary, the dimensions of the various features can be arbitrarily expanded or reduced for clarity.

Figure 1:
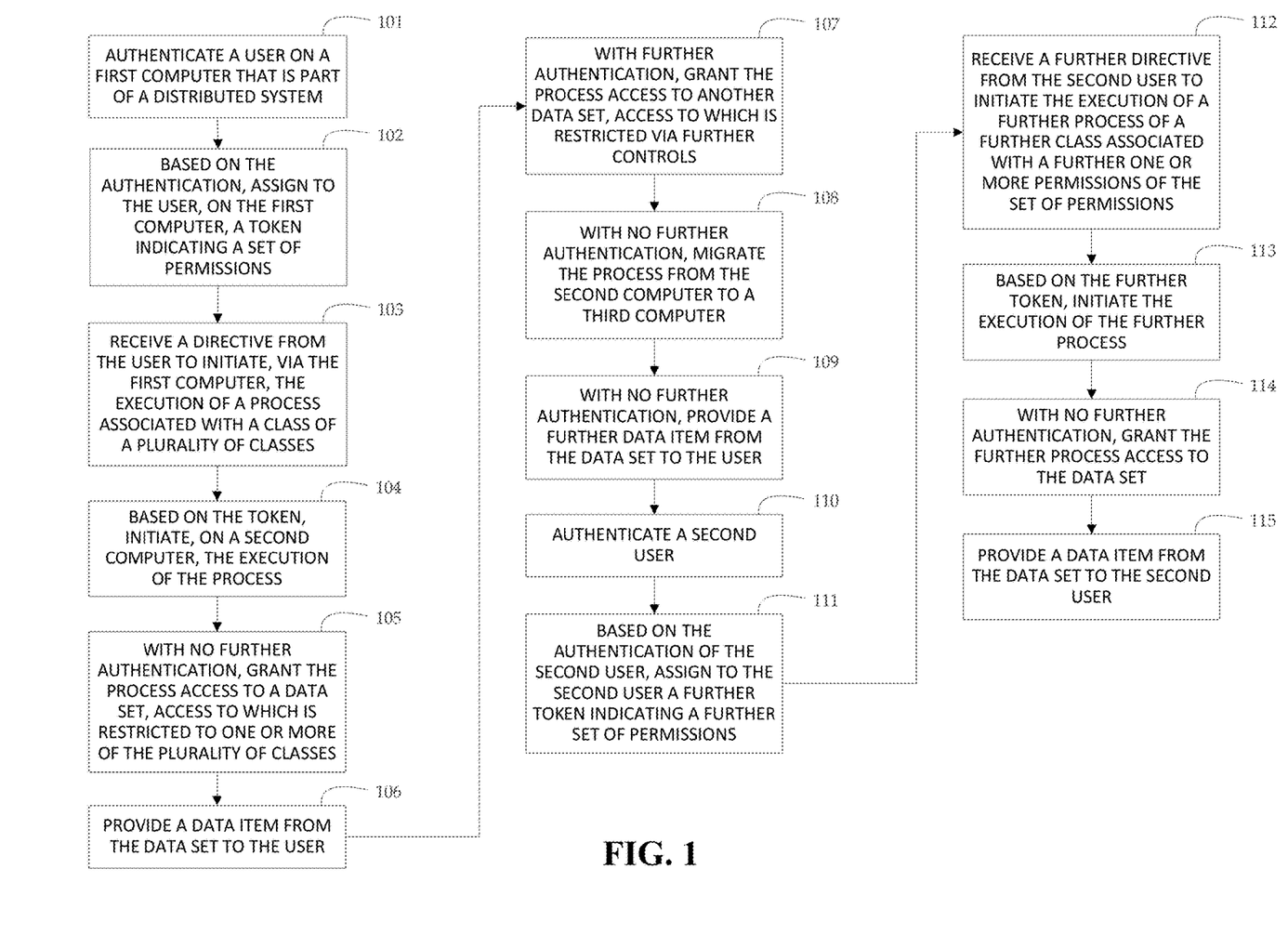
FIG. 1 exemplarily shows a high-level flow chart for a cloud resource protection method 100 according to an embodiment of the present invention.

By way of introduction of the example depicted in FIG. 1, an embodiment of a cloud resource protection method 100 according to the present invention can include various steps for assigning processes and/or applications runnable on a distributed system to classes, such that each class is associated with an access control policy. Every node in the system can recognize the same set of policies, so that a user interacting with any node can be authorized to run processes of a given class. Data can be associated with processes or with associated classes and can be accessed by virtue of the same authorization that has given the user permission to run the process.

Figure 3:
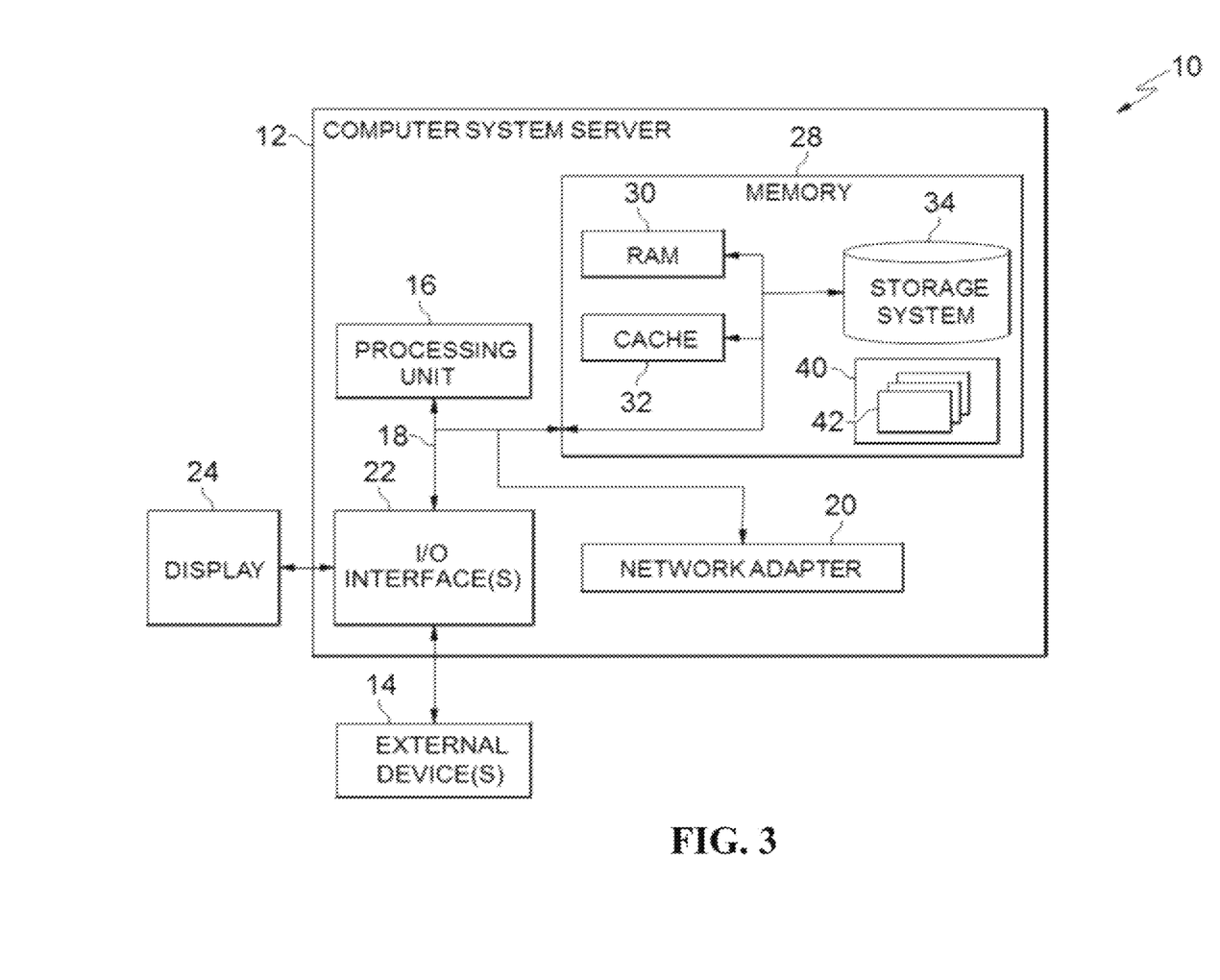
FIG. 3 depicts a cloud-computing node 10 according to an embodiment of the present invention.

By way of introduction of the example depicted in FIG. 3, one or more computers of a computer system 12 according to an embodiment of the present invention can include a memory 28 having instructions stored in a storage system to perform the steps of FIG. 1.

Referring now generally to the embodiments of the invention, the invention turns a set of process classes into the focal point of authentication and makes this consistent across a cloud environment or other distributed system. A token or other data structure can indicate the user's authorization, throughout the system, to run processes of a given class. The token may take the form of a data structure, comprising for example a set of process class identifiers, and/or a set of permissions, and/or an access control list, and/or a voucher of authentication status, stored in memory accessible by the nodes of the distributed system. The token may be an object of a class that comprises all or part of a component, such as a loadable module, shared by the nodes of the distributed system. The token may be shared via a mechanism such as shared memory, a named pipe, a socket, or any other means suitable for sharing data between the nodes of a distributed system. The token may be protected from race conditions among the nodes and processes that need access to it via a synchronization object shared by the nodes of the distributed system, via a lock-free synchronization algorithm executed by processes running on the distributed system, or via other synchronization means. The token also may be encrypted or otherwise secured.

Figure 2A:
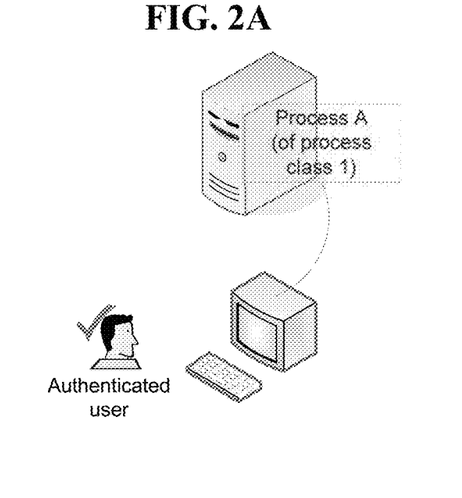
FIGS. 2A-2C exemplarily depict an access control policy flow according to an embodiment of the present invention.

Once the user has been authenticated, throughout the system, to run processes of a given class, the user (e.g., authenticated user) can then launch or otherwise work with any such process, which can be started on or migrated to any node based on resource availability, geographical proximity with the user's console, or other factors. The user also can access data, based on the same authorization. Any data ordinarily used by a process can be made accessible to that process and/or to other processes of the class (i.e., process class). For example, as depicted in FIG. 2A, process A (of process class 1) is run at the system level by the user since the user is an authorized user.

Figure 2B:
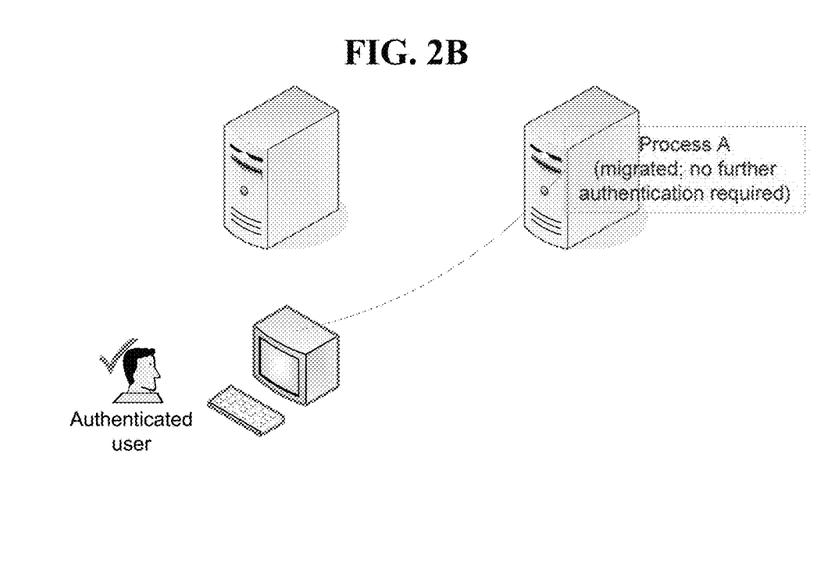

The user then launches or otherwise works with any such process, which can be started on or migrated to any node based on resource availability, geographical proximity with the user's console, or other factors. For example, as depicted in FIG. 2B, the process A is migrated to a second system and no further authentication is required for the authenticated user to work with the process A. That is, the user has already been authenticated to run Process A regardless of where process A has migrated. The user also can access data (or any other resource), based on the same authorization. Any data ordinarily used by a process can be made accessible to that process and/or to other processes of the class.

Other data that may be accessed via the process, such as database data, may be subject to further access controls.

For example, a bar code scanning application may typically need access to a scanned bar code repository. By getting permission to run the bar code scanning application on a non-virtualized cloud infrastructure, the user also gets permission to access that repository. However, if the user needs access to a customer database, into which data from the repository may occasionally be uploaded, the user can be made to authenticate separately to the database.

Highly flexible arrangements are readily possible within this model. A user may get permissions for multiple classes at once. A process, and data that may or may not necessarily be accessed by the process, may be associated with more than one class, too.

Applications that share data may be arranged so that one class is associated with one application and the data typically accessed by it, and another class is associated with another application and the same data.

Figure 2C:
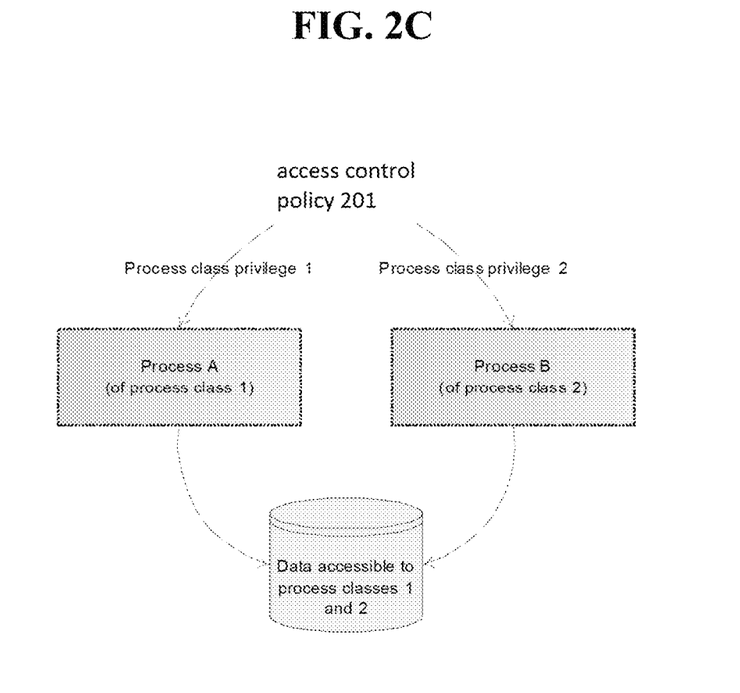

For example, as depicted in FIG. 2C, an access control policy 201 can control class privilege 1 and 2 for Process A (of process class 1) and Process B (of process class 2) such that the data is accessible for the authenticated user to process classes 1 and 2.

To arrange applications and data to be accessible to appropriately authenticated users, an implementation of the invention will need to provide at least (1) an interface aspect that allows for a certain application and for certain data to be associated with a class that is part of a set of classes, and (2) an interface aspect that allows for one or more of the classes to be associated with an access control policy. Thus, the embodiments described herein can allow for rich and fine-grained access control that is consistent throughout a cloud environment, elimination of hardware virtualization overhead, and improved security relative to virtualized clouds.

Referring now to FIG. 1, in step 101, a user, on a first computer that is part of a distributed system, is authenticated.

In step 102, based on the authentication, on the first computer, a token indicating a set of permissions is assigned to the user.

In step 103, a directive from the user to initiate (i.e., execute) a process is received, via the first computer, for the execution of a process associated with a class. The class may be one of a plurality of classes and is associated with one or more permissions of the set of permissions.

In step 104, based on the token, on a second computer, the execution of the process is initiated.

In step 105, with no further authentication than in steps 101-104, the process is granted access to a data set, access to which is restricted to one or more of the plurality of classes. The one or more of the plurality of classes includes the class associated with the process.

In step 106, a data item is provided from the data set to the user.

In step 107, with further authentication, the process is granted access to another data set (i.e., a database, a bar code scanning application database, etc.), the access of which is restricted via further controls.

In step 108, with no further authentication, the process is migrated from the second computer to a third computer.

In step 109, with no further authentication, a further data item is provided from the data set to the user.

In step 110, a second user is authenticated.

In step 111, based on the further authentication, the second user is assigned a further token indicating a further set of permissions;

In step 112, a further directive is received from the second user to initiate the execution of a further process of a further class associated with a further one or more permissions of the set of permissions. The one or more of the plurality of classes includes the further class.

In step 113, based on the further token, the execution of the further process is initiated.

In step 114, with no further authentication, access by the further process to the data set is granted.

In step 115, a data item from the data set is provided to the further user.

Thus, the embodiments described herein can assign executing processes to classes (i.e., process classes as opposed to application classes), where a class is associated with a given security policy. It is noted that an application class is less granular and flexible than a process class which the method 100 is intended to handle. A process can be associated with a class based on a given software component or module that is loaded by an application, or based on a service accessed by an application, or based on data used by an application. Process classes are more capable of changing and updating in real time than the less granular application classes.

For example, a system service itself, or a device driver, or any other processes also can be associated with a process class and made subject to the same set of security policies that govern applications. Data associated with a process can also be assigned to a process class, making a system based on the embodiments described herein flexible to provide a complete security model for a cloud computing environment without requiring the overhead of hardware virtualization.

Exemplary Aspects, Using a Virtualized Cloud Computing Environment

Although this detailed description includes an exemplary embodiment of the present invention in a cloud computing environment, it is to be understood that implementation of the teachings recited herein are not limited to such a cloud computing environment. Rather, embodiments of the present invention are capable of being implemented in conjunction with any other type of distributed computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client circuits through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 3, a schematic of an example of a cloud computing node is shown. Cloud computing node 10 is only one example of a suitable node and is not intended to suggest any limitation as to the scope of use or functionality of embodiments of the invention described herein. Regardless, cloud computing node 10 is capable of being implemented and/or performing any of the functionality set forth herein.

Although cloud computing node 10 is depicted as a computer system/server 12, it is understood to be operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop circuits, multiprocessor systems, microprocessor-based systems, set top boxes, programmable consumer electronics, network PCs, minicomputer systems, mainframe computer systems, and distributed cloud computing environments that include any of the above systems or circuits, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing circuits that are linked through a communications network. In a distributed cloud computing environment, program modules may be located in both local and remote computer system storage media including memory storage circuits.

Referring now to FIG. 3, a computer system/server 12 is shown in the form of a general-purpose computing circuit. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further described below, memory 28 may include a computer program product storing one or program modules 42 comprising computer readable instructions configured to carry out one or more features of the present invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may be adapted for implementation in a networking environment. In some embodiments, program modules 42 are adapted to generally carry out one or more functions and/or methodologies of the present invention.

Computer system/server 12 may also communicate with one or more external devices 14 such as a keyboard, a pointing circuit, other peripherals, such as display 24, etc., and one or more components that facilitate interaction with computer system/server 12. Such communication can occur via Input/Output (I/O) interface 22, and/or any circuits (e.g., network card, modem, etc.) that enable computer system/server 12 to communicate with one or more other computing circuits. For example, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, circuit drivers, redundant processing units, external disk drive arrays, RAID systems, tape drives, and data archival storage systems, etc.

Figure 4:
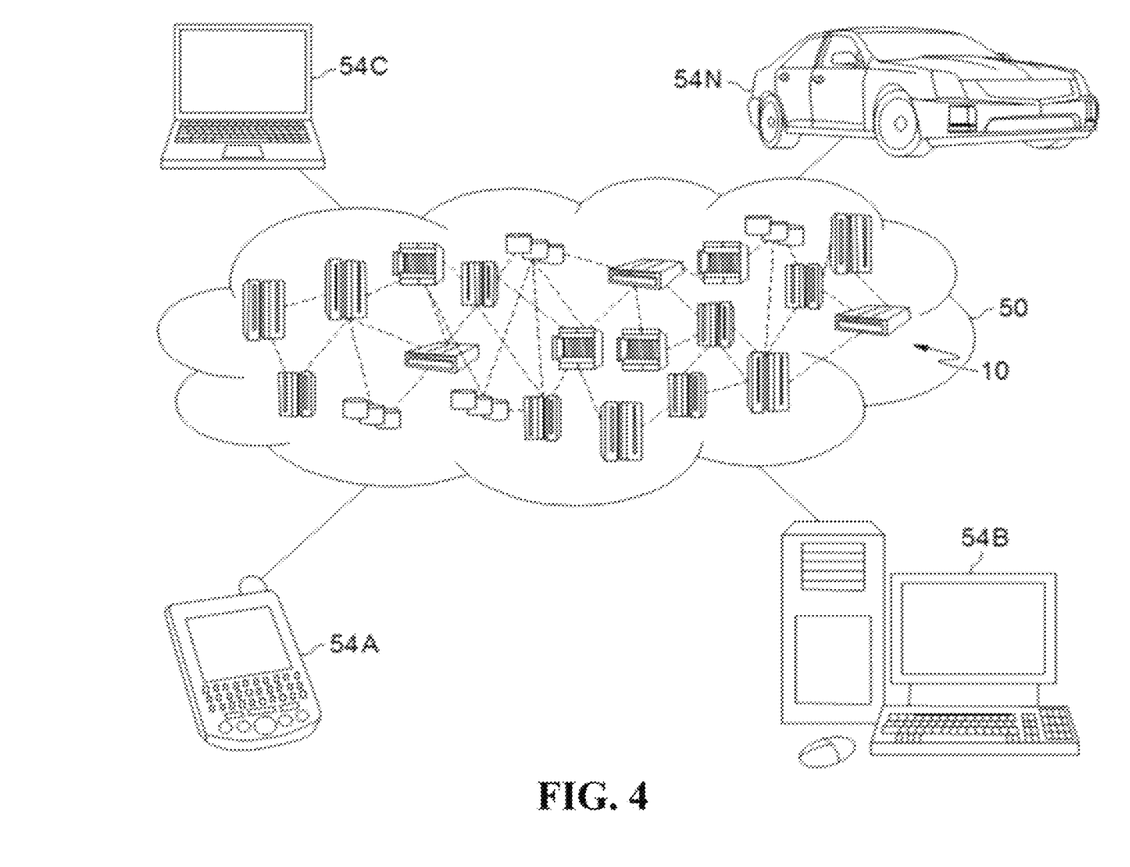
FIG. 4 depicts a cloud-computing environment 50 according to an embodiment of the present invention.

Referring now to FIG. 4, illustrative cloud computing environment 50 is depicted. As shown, cloud computing environment 50 comprises one or more cloud computing nodes 10 with which local computing circuits used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing circuit. It is understood that the types of computing circuits 54A-N shown in FIG. 4 are intended to be illustrative only and that computing nodes 10 and cloud computing environment 50 can communicate with any type of computerized circuit over any type of network and/or network addressable connection (e.g., using a web browser).

Figure 5:
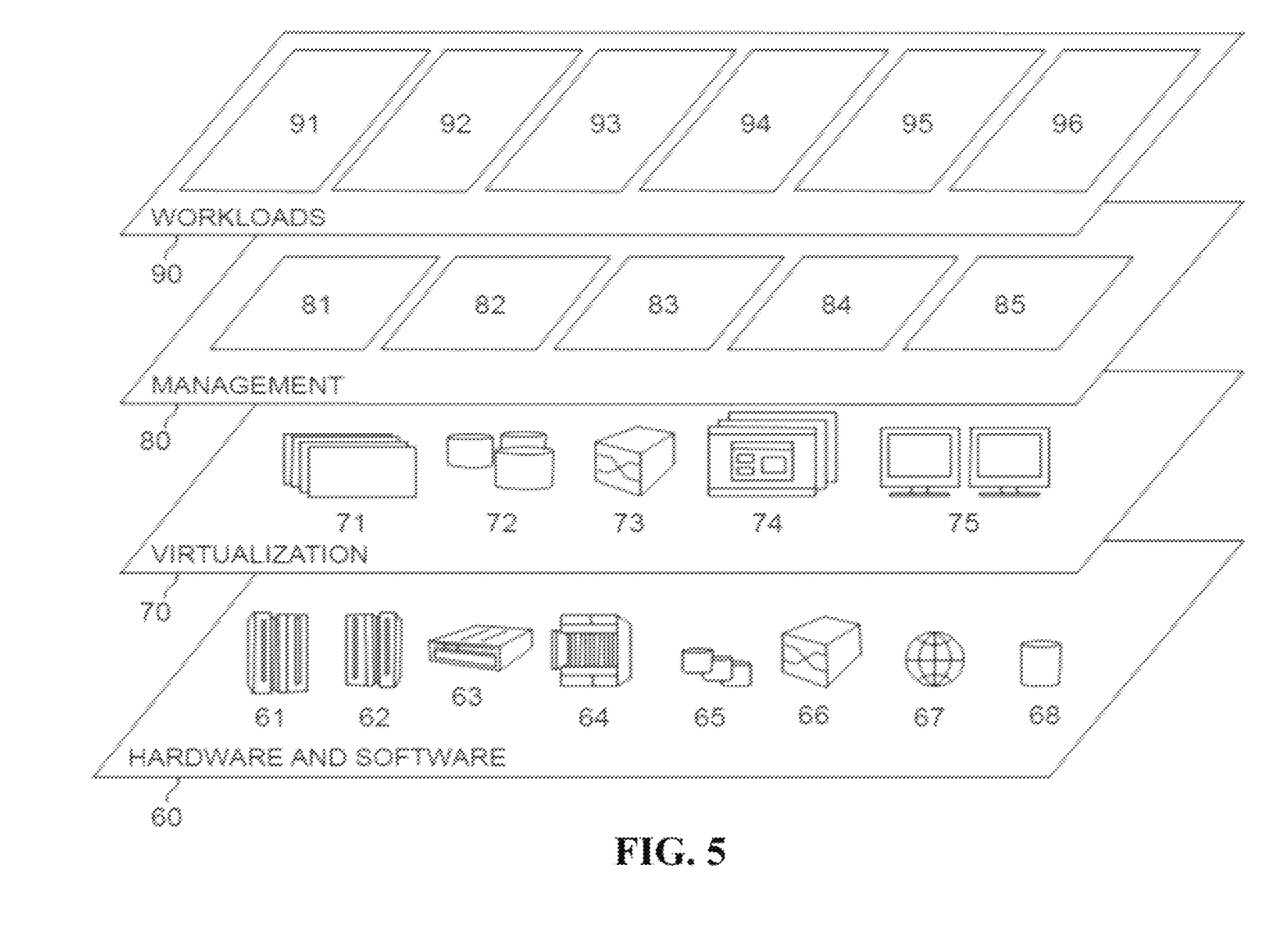
FIG. 5 depicts abstraction model layers according to an embodiment of the present invention.

Referring now to FIG. 5, an exemplary set of functional abstraction layers provided by cloud computing environment 50 (FIG. 4) is shown. It should be understood in advance that the components, layers, and functions shown in FIG. 5 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage circuits 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and cloud resource protection method 100 in accordance with the present invention.

Exemplary Aspects, Using a Nonvirtualized Cloud Computing Environment

While the cloud computing model may include all of the characteristics, service models, and deployment models described above, not all of those aspects are required in every cloud computing environment. In some cloud computing environments, the virtualization layer 70 of FIG. 5 may be left out to reduce complexity and overhead. Nevertheless, conventional capabilities of the cloud computing model, which include the capability to balance workloads by migrating processes from node to node, can be retained despite the lack of a virtualization layer.

Figure 6:
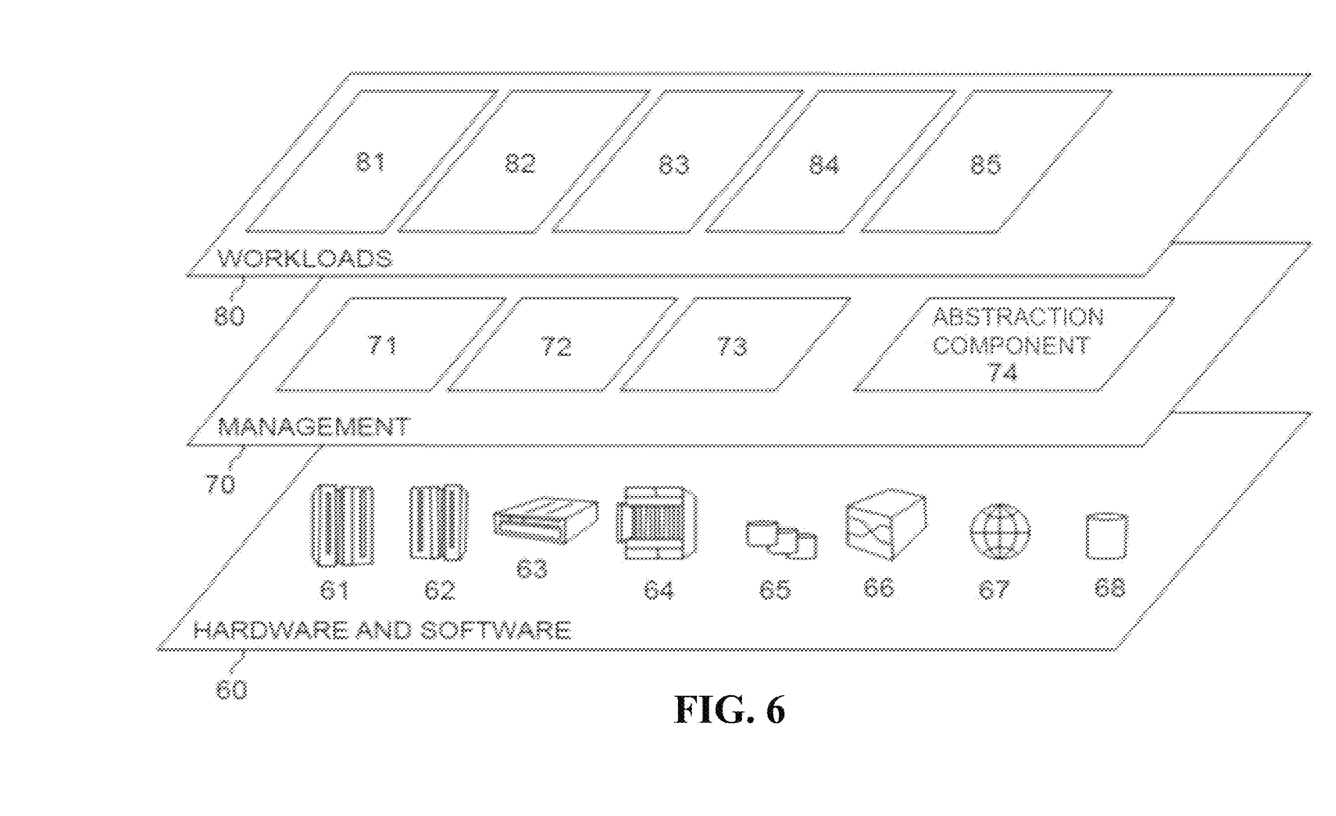
FIG. 6 exemplarily depicts a set of functional abstraction layers provided by a nonvirtualized cloud computing environment.

Referring now to FIG. 6, an exemplary set of functional abstraction layers provided by a nonvirtualized cloud computing environment is shown. It should be understood in advance that the components, layers, and functions shown in FIG. 6 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage circuits 65; and networks and networking components 66. In some embodiments, software components include network application server software 67 and database software 68.

Management layer 70 may provide the functions described below. Resource provisioning 71 provides dynamic procurement of computing resources and other resources that are utilized to perform tasks within the cloud computing environment. Metering and Pricing 72 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 73 provides access to the cloud computing environment for consumers and system administrators. Service level management and Service Level Agreement (SLA) planning and fulfillment functions also may be provided to provide pre-arrangement for, and procurement of, cloud computing resources for which a future requirement is anticipated in accordance with an SLA.

An abstraction component 74 may provide an additional function of management layer 70. Abstraction component 74 can provide thunk or intercession functionality to abstract I/O and access to resources made available by hardware and software layer 60. Native code applications, services, and drivers may access hardware and software layer 60 via abstraction component 74, for example by invoking functions provided as part of an Application Program Interface (API) by abstraction component 74. Thus, a process that is migrated from one node to another may continue to perform I/O operations and may continue to access the resources made available by hardware and software layer 60, during and after the migration, without requiring custom code to enable migration of the process from node to node. In some embodiments, the nodes can be sufficiently similar that the migration can be performed as follows: first, the process can be suspended at a first node prior to migration; second, its state, including its entire virtual memory content, can be recreated on a second node (e.g. a virtual memory region can be committed on the second node, corresponding to each virtual memory region owned by the suspended process, and the content of each region can be copied from node to node); and third, the process can be resumed on the second node. In certain embodiments, if any regions cannot be placed in their prior address ranges then any pointers to those regions can be updated throughout the virtual memory at migration time, to reflect the change. In those certain embodiments, updating of pointers can be arranged by abstraction component 74 if memory is allocated and pointers to it created and copied exclusively via abstraction component 74. In other embodiments, abstraction component 74 can be implemented as kernel-mode software that can ensure that the virtual memory committed for use by the migrated process is assigned a virtual address range designated by abstraction component 74 to be identical to that of the equivalent virtual address range of the process prior to its migration. In some embodiments, a migrating process need not be suspended, but can instead be subject first to aggressive page-out operations, then, second, to a recreation of a minimal working set of pages of a first node at a second node, and third, to a transfer of its execution context to the second node, onto which swapped out pages can be paged in as they are accessed after the execution context has been transferred. In the various embodiments, process migration may be performed with low overhead and may yet further eliminate overhead by not requiring a virtualization layer for migration enablement.

Workloads layer 80 provides examples of functionality for which the cloud computing environment may be utilized. Examples of workloads and functions which may be provided from this layer include: mapping and navigation 81; software development and lifecycle management 82; virtual classroom education delivery 83; data analytics processing 84; transaction processing 85; and cloud resource protection method 100 in accordance with the present invention.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), a Storage Area Network (SAN), a Network Attached Storage (NAS) device, a Redundant Array of Independent Discs (RAID), an erasable programmable read-only memory (EPROM or Flash memory), a static random access memory (SRAM), a portable compact disc read-only memory (CD-ROM), a digital versatile disk (DVD), a memory stick, a USB "thumb" drive, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Further, Applicant's intent is to encompass the equivalents of all claim elements, and no amendment to any claim of the present application should be construed as a disclaimer of any interest in or right to an equivalent of any element or feature of the amended claim.

What is claimed is:

1. A computer-implemented cloud resource protection method performed in a cloud-computing environment, the method comprising:

authenticating a user on a first computer that is part of a distributed system;

based on the authentication, assigning to the user, on the first computer, a data structure indicating a set of permissions;

receiving a directive from the user to initiate, via the first computer, an execution of a process associated with a first class, wherein the first class is one of a plurality of classes and is associated with one or more permissions of the set of permissions;

based on the data structure, initiating, on a second computer, the execution of the process;

with no further authentication, controlling access by granting the process access to a data set, access to which is restricted to one or more classes of the plurality of classes, wherein the one or more classes of the plurality of classes includes the first class associated with the process;

providing a data item from the data set to the user;

while the process runs, dynamically assigning the process to the process class based on one of:
 a loadable module that is loaded by an application;
 a service accessed by the application; or
 data used by the application; and assigning a process to the first class, such that via a class-based access control policy, the process assigned to the first class accessing the data of the class is controlled, on demand, further comprising:
 with no further authentication, migrating the process from the second computer to a third computer; and
 with no further authentication, providing a further data item from the data set to the user, and an abstraction component, embodied in the cloud computing environment, that facilitates the migration such that if any virtual memory regions belonging to the process being migrated cannot be placed in their prior address ranges, then any pointers to those regions are updated throughout the virtual memory at migration time.

2. The computer-implemented method of claim 1, further comprising, with further authentication, granting the process access to another data set, access to which is restricted via controls.

3. The computer-implemented method of claim 1, further comprising:
 further authenticating a second user;
 based on the further authentication, assigning to the second user a further data structure indicating a further set of permissions;
 receiving a directive from the second user to initiate an execution of a further process of a second class associated with a further one or more permissions of the further set of permissions;
 based on the further data structure, initiating the execution of the further process;
 with no further authentication, granting the further process access to the data set; and
 providing a data item from the data set to the second user.

4. The computer-implemented method of claim 3, wherein the one or more classes of the plurality of classes includes the second class.

5. A computer program product for cloud resource protection embodied in a cloud computing environment, the computer program product comprising a computer-readable storage medium having program instructions embodied therewith, the program instructions executable by a computer to cause the computer to perform:

authenticating a user on a first computer that is part of a distributed system;

based on the authentication, assigning to the user, on the first computer, a data structure indicating a set of permissions;

receiving a directive from the user to initiate, via the first computer, an execution of a process associated with a first class, wherein the first class is one of a plurality of classes and is associated with one or more permissions of the set of permissions;

based on the data structure, initiating, on a second computer, the execution of the process;

with no further authentication, controlling access by granting the process access to a data set, access to which is restricted to one or more classes of the plurality of classes, wherein the one or more classes of the plurality of classes includes the first class associated with the process;

providing a data item from the data set to the user;

while the process runs, dynamically assigning the process to the process class based on one of:
 a loadable module that is loaded by an application;
 a service accessed by the application; or
 data used by the application; and assigning a process to the first class, such that via a class-based access control policy, the process assigned to the first class accessing the data of the class is controlled, on demand, further comprising:
 with no further authentication, migrating the process from the second computer to a third computer; and
 with no further authentication, providing a further data item from the data set to the user, and an abstraction component, embodied in the cloud computing environment, that facilitates the migrating such that if any virtual memory regions belonging to the process being migrated cannot be placed in their prior address ranges, then any pointers to those regions are updated throughout the virtual memory at migration time.

6. The computer program product of claim 5, further comprising, with further authentication, granting the process access to another data set, access to which is restricted via controls.

7. The computer program product of claim 5, further comprising:
 further authenticating a second user;
 based on the further authentication, assigning to the second user a further data structure indicating a further set of permissions;
 receiving a directive from the second user to initiate an execution of a further process of a second class associated with a further one or more permissions of the further set of permissions;
 based on the further data structure, initiating the execution of the further process;
 with no further authentication, granting the further process access to the data set; and
 providing a data item from the data set to the second user.

8. The computer program product of claim 7, wherein the one or more classes of the plurality of classes includes the second class.

9. A cloud resource protection system embodied in a cloud computing environment, said system comprising:
 a processor; and a memory, the memory storing instructions to cause the processor to perform:
authenticating a user on a first computer that is part of a distributed system;
based on the authentication, assigning to the user, on the first computer, a data structure indicating a set of permissions;
receiving a directive from the user to initiate, via the first computer, an execution of a process associated with a first class, wherein the first class is one of a plurality of classes and is associated with one or more permissions of the set of permissions;
based on the data structure, initiating, on a second computer, the execution of the process;
with no further authentication, controlling access by granting the process access to a data set, access to which is restricted to one or more classes of the plurality of classes, wherein the one or more classes of the plurality of classes includes the first class associated with the process;
providing a data item from the data set to the user;
while the process runs, dynamically assigning the process to the process class based on one of:
a loadable module that is loaded by an application;
a service accessed by the application; or
data used by the application; and
assigning a process to the first class, such that via a class-based access control policy, the process assigned to the first class accessing the data of the class is controlled, on demand, further comprising:
with no further authentication, migrating the process from the second computer to a third computer; and
with no further authentication; providing a further data item from the data set to the user, and
an abstraction component, embodied in the cloud computing environment, that facilitates the migrating such that if any virtual memory regions belonging to the process being migrated cannot be placed in their prior address ranges, then any pointers to those regions are updated throughout the virtual memory at migration time.

10. The system of claim 9, further comprising, with further authentication, granting the process access to another data set, access to which is restricted via controls.

11. The computer-implemented method of claim 1, wherein the providing provides the data item from the data set to the user via the second computer in the distributed system.

12. The computer-implemented method of claim 1, wherein, with no further authentication, the granting grants the process access to the data set via the second computer in the distributed system.

13. The computer-implemented method of claim 1, wherein the migrating migrates the process from the second computer to the third computer without migrating the virtual machine.

* * * * *